United States Patent [19]

Sewards

[11] Patent Number: 4,505,780

[45] Date of Patent: Mar. 19, 1985

[54] JOINING WEATHERSTRIPPINGS

[75] Inventor: George R. Sewards, Barton, England

[73] Assignee: Linear Limited, Durham, England

[21] Appl. No.: 510,823

[22] Filed: Jul. 5, 1983

[30] Foreign Application Priority Data

May 27, 1983 [GB] United Kingdom ............... 8314841

[51] Int. Cl.³ ................... B29C 27/06; B29C 27/08; B65H 69/08
[52] U.S. Cl. ............................... 156/507; 156/304.2; 156/304.6; 156/502; 156/580.1; 156/583.1
[58] Field of Search ............... 156/159, 304.3, 304.6, 156/304.2, 502, 507, 580.1, 583.1

[56] References Cited

U.S. PATENT DOCUMENTS

| 3,647,599 | 3/1972 | Gardner | 156/502 |
| 3,798,099 | 3/1974 | Marcatili | 156/304.6 |
| 3,870,584 | 3/1975 | Jöres et al. | 156/507 |
| 4,082,592 | 4/1978 | Raabe et al. | 156/304.6 |
| 4,421,591 | 12/1983 | DeLigt | 156/304.6 |

Primary Examiner—Michael Wityshyn
Attorney, Agent, or Firm—Leydig, Voit, Osann, Mayer & Holt, Ltd.

[57] ABSTRACT

Two weatherstrippings are joined before the application of any backing to the woven strip of artificial yarn which carries the rows of pile which form the air barrier. A plastics material is placed across the butted ends of the strips in contact with the lower surfaces of the strips and the two are then welded together ultrasonically to join the weatherstrippings. The backing can then be applied over the joint. A jig for performing such a joining method comprises two holders for carrying the strips by their pile with the lower surfaces uppermost. The holders are formed in two parts to allow the strips to be cut to form a clean straight end. One part of each holder is then removed and the remaining parts slid together to butt the two strips. A piece of heat-weldable material is then placed over the butted ends in contact with the lower surfaces and is heat welded to the strips to complete the join.

3 Claims, 1 Drawing Figure

U.S. Patent    Mar. 19, 1985    4,505,780
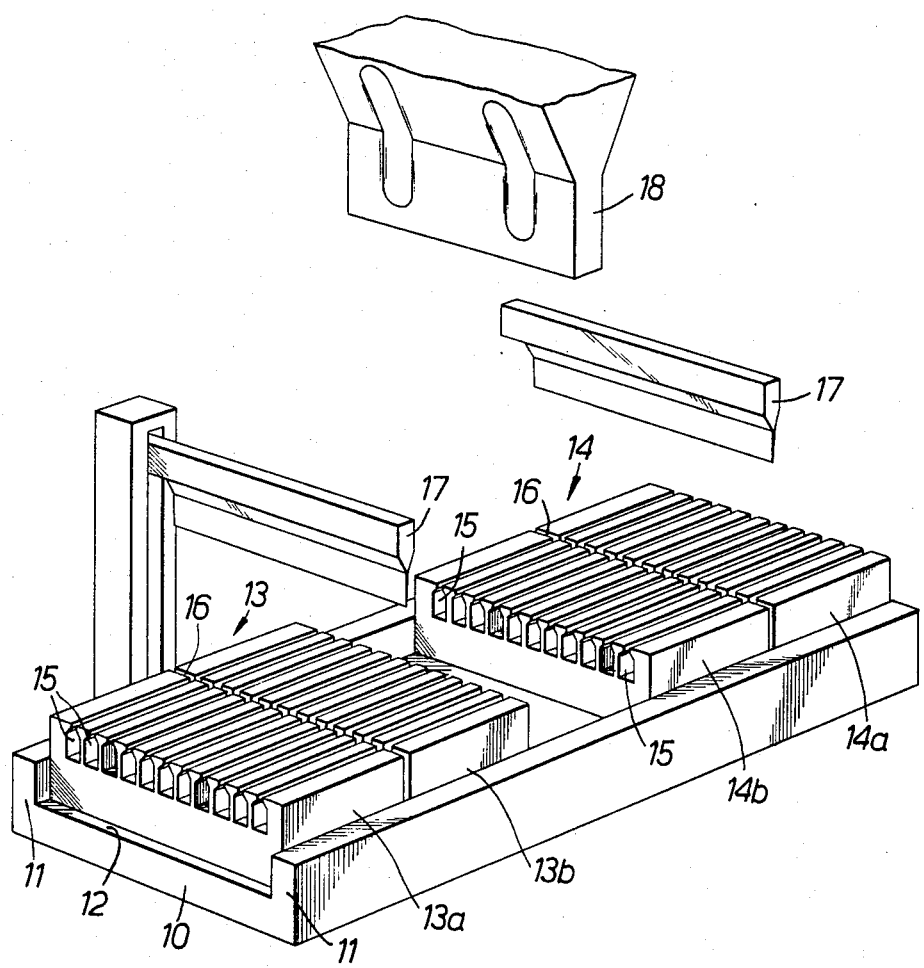

JOINING WEATHERSTRIPPINGS

BACKGROUND TO THE INVENTION

1. Field of the Invention

The invention relates to the connection of woven pile weatherstrippings of the kind for sealing a gap between, for example, door or window frame members.

Woven pile weatherstripping is formed from a strip which woven from an artificial yarn and which has a pile extending from an upper surface of the strip. The other surface of the strip (the lower surface) is commonly (but not always) coated with a resin or a plastics material or metal backing to stiffen the strip, to hold the pile in position and to prevent the strip from fraying.

Under certain circumstances, it may be desirable to join two or more pile weatherstripings. For example, a joint can be made after the removal of the flawed lengths or to connect separately produced weatherstrippings.

2. Review of the Prior Art

Such a joint has previously been made after completion of the weatherstripping by the use of a piece of tape or fibre gores connected to the resin or plastics or metal backing across the ends of the two weatherstrippings. Such a join, however, causes an irregularity in the combined strip which shows up clearly when the joined weatherstripping is wound onto a reel. In addition, it can prevent the weatherstripping from being pushed readily into a channel.

SUMMARY OF THE INVENTION

According to a first aspect of the invention, there is provided a method of joining two lengths of weatherstripping formed from a strip which has upper and lower surfaces, which is woven from an artificial yarn and which carries a pile on the upper surface thereof, the method comprising, before the application of any backing to the strip, butting the ends of the strips together, placing a strip of heat-weldable material across the butted ends and in contact with lower surfaces of the strips and then fusing the material to the strips to join the two lengths together.

According to a second aspect of the invention, there is provided a jig for joining weatherstripping of the kind comprising a strip which has upper and lower surfaces, which is woven to form an artificial yarn and which carries a pile on the upper surface thereof, the jig comprising two holders each for holding a respective strip so that the two strips are aligned with one another with the ends thereof abutted together and so that their lower surfaces are exposed for the application of a strip of heat fusible material across the butted ends and in contact with said lower surfaces of the strips, and a fusing device for fusing the heat fusible material to the strips to join the two lengths together.

BRIEF DESCRIPTION OF THE DRAWING

The following is a more detailed description of one embodiment of the invention, by way of example, reference being made to the accompanying drawing in which the FIGURE is a schematic perspective view of a jig for joining weatherstripping.

DESCRIPTION OF THE PREFERRED EMBODIMENTS

The jig to be described with reference to the drawing is for joining together lengths of woven pile weatherstripping which is formed from a strip woven from an artificial yarn which has a pile extending from an upper surface of the strip. In general, a single woven strip carries a plurality of side-by-side but spaced piles and the strip is subsequently slit between the piles to form individual weatherstrippings. The strip and the pile may be formed from the same artificial yarn, such as a polypropylene yarn. The lower surface of the strip is commonly (but not always) coated with resin or a plastics material or has a metal backing applied thereto to stiffen the strip, to hold the pile in position and to prevent the strip fraying.

Under certain circumstances, it may be desired to join two such strips together. For example, a length of strip may be flawed and it may be required to cut the flaw out of the strip and then join together the ends of the strips so formed. In addition, it can sometimes be required to join two shorter strips together to form a longer strip.

Referring first to FIG. 1, the jig for joining such weatherstripping comprises a base 10 having parallel upstanding side edges 11 which form a slideway 12. Two weatherstripping holders 13, 14 are formed by blocks which are slidable along the slideway 12. Each holder 13, 14 is provided with a plurality of side-by-side but spaced guide slots 15 which extend along the holders 13, 14. The guide slots 15 of one holder 13 are aligned with the guide slots 15 of the other holder 14. Each slot has the same cross-section as the cross-section of a pile on the strip and the slots 15 on each holder 13, 14 have the same spacing and the same number as the piles on each strip. This enables the piles on a strip to be pushed into the slots 15 so that the strip lies on the upper surface of the associated holder 13, 14 with its lower surface uppermost.

Each holder 13, 14 is formed in two parts. One part 13a, 14a is fixed in the slideway 12, but the other part 13b, 14b, the part which is closest to the other holder, can be removed from the slideway 12. There is a gap 16 between the two parts 13a, 13b, 14a, 14b of each holder, which, when the holders are in the retracted positions shown in the drawing, is aligned with a heated knife 17 which can be moved vertically into and out of the gap 16. When the removable holder parts 13b, 14b are taken away from the slideway, the fixed holder parts 13a, 14a can be slid into end-to-end abutment, when their abutting ends are in vertical register with an ultrasonic welding horn 18.

The jig is used in the following way.

The strips to be joined are brought to the jig before any backing is applied to them. The piles on each strip are then inserted into the guide slots 15 of one of the holders 13, 14 starting at the fixed holder part 13a, 14a of each holder 13, 14, until the ends of the strips reach the ends of the removable holder parts 13b, 14b. With the holders 13, 14 in the retracted positions shown, the heated knives 17 are then lowered to cut the strips. This seals the ends of the yarns forming the strips and also seals the pile.

The removable holder parts 13b, 14b are then taken away from the slideway 12 together with the cut ends of the strips. The fixed holder parts 13a, 14a are then slid towards one another until they abut; so abutting the ends of the two strips. Because the guide slots 15 are aligned with one another, the piles of the two strips will also be aligned with one another.

In this abutted position, the ultrasonic welding horn 18 is then lowered and operated to heat the abutting ends of the two strips. This melts any beads which may have been formed during the cutting of the strips by the heated knives 17. A heat fusable material (not shown) is then placed across the abutted strips on the exposed lower surfaces of these strips. The heat fusable material may be a woven strip of artificial fibre or may be a plastics film. The ultrasonic welding horn 18 is then lowered again and operated to fuse together the plastics material and the lower surfaces of the strips.

The joined strips are then removed from the holders and have a backing applied to them. As explained above, this backing may be a resin or a plastics material or a metal backing. Where the backing is a resin or a plastics material, it has been found that, after the backing has been applied, the joint is substantially invisible. This ensures that a reel of weatherstripping can be produced which is free from flaws and which is in a continuous length. This allows the reel of weatherstripping to be used readily and rapidly and means that the user has no scrap. In addition, a joint of this kind produces no irregularity in the completed weatherstripping which might prevent or interfere with the sliding of the weatherstripping into a groove or channel.

It will be appreciated that the heat welding need not be achieved ultrasonically, any suitable heat sealing or fusing device may be used.

I claim:

1. A jig for joining weatherstrippings formed by a strip which has upper and lower surfaces, which is woven from an artifical yarn and which carries a plurality of side-by-side but spaced rows of pile on the upper surface thereof, the jig comprising:

a slideway, two holders slidable in the slideway, a plurality of parallel but spaced pile-receiving guide slots extending along the holders for receiving the side-by-side but spaced rows of pile respective weatherstrippings, the guide slots of one holder being aligned with the guide slots of the other holder, each holder being formed in two parts, one holder part being closer to the other holder than the other holder part, each said closer holder part being removable from the slideway, each said other holder part being slidable in the slideway, after removal of said closer holder parts, until said other holder parts abut one another, a tap provided between the parts of each holder, heated knife means, a fusing device arranged between the holders to fuse a strip of heat fusible material across the butted cut ends of the two weatherstrippings held in alignment in said other holder parts, with the pile rows arranged in the guide slots, the cut ends being formed prior to fusing by said heated knife means cutting the weatherstrippings at said gaps, the cut end portions in the closer holder parts then being removed with said closer holder parts, and the other holder parts being slid together to abut the cut ends of the weatherstrippings for said fusing together.

2. A jig according to claim 1 wherein the fusing device is an ultrasonic welding device.

3. A jig according to claim 1 wherein the fusing device is a heat welding device.

* * * * *